Nov. 2, 1965   J. H. PAULICK, JR   3,214,822
TURRET GAGE
Filed Sept. 27, 1962   6 Sheets-Sheet 1
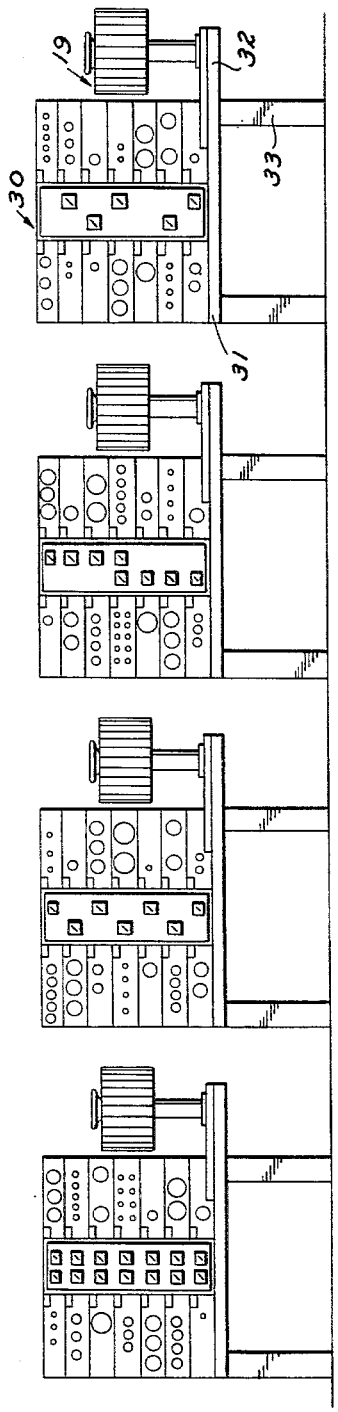
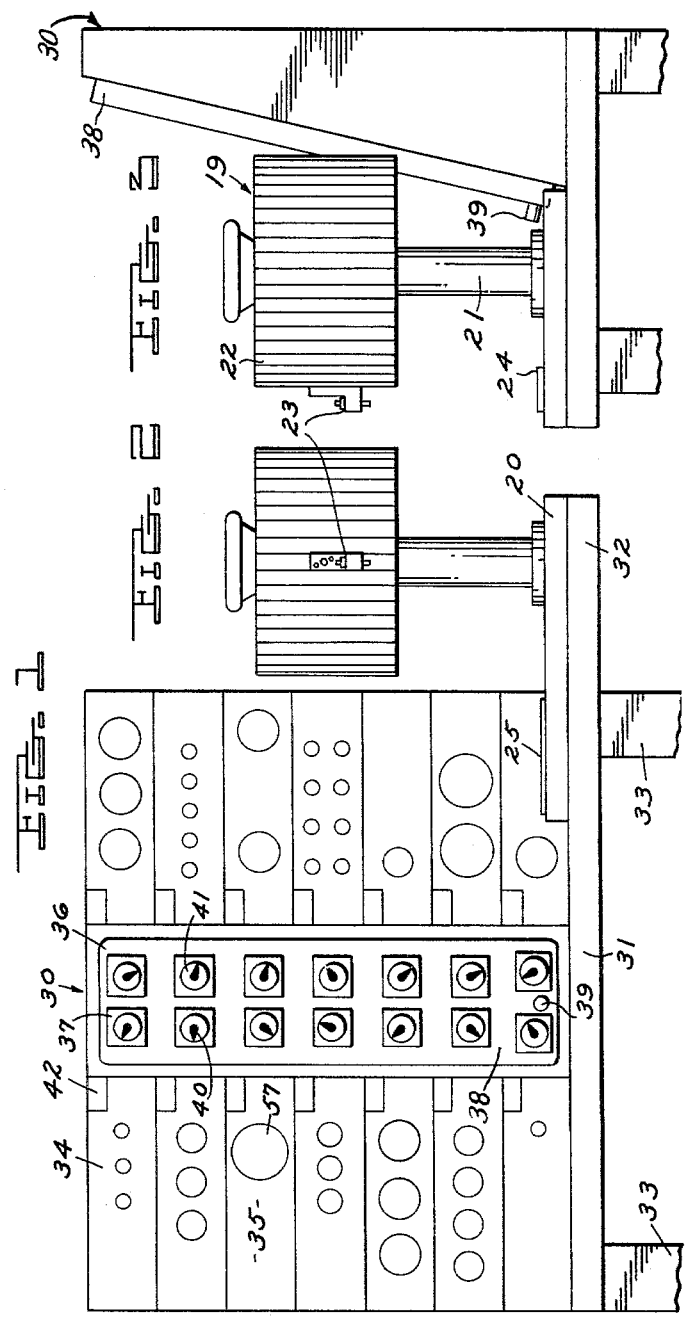
INVENTOR.
JOSEPH H. PAULICK, JR.
BY
ATTORNEY

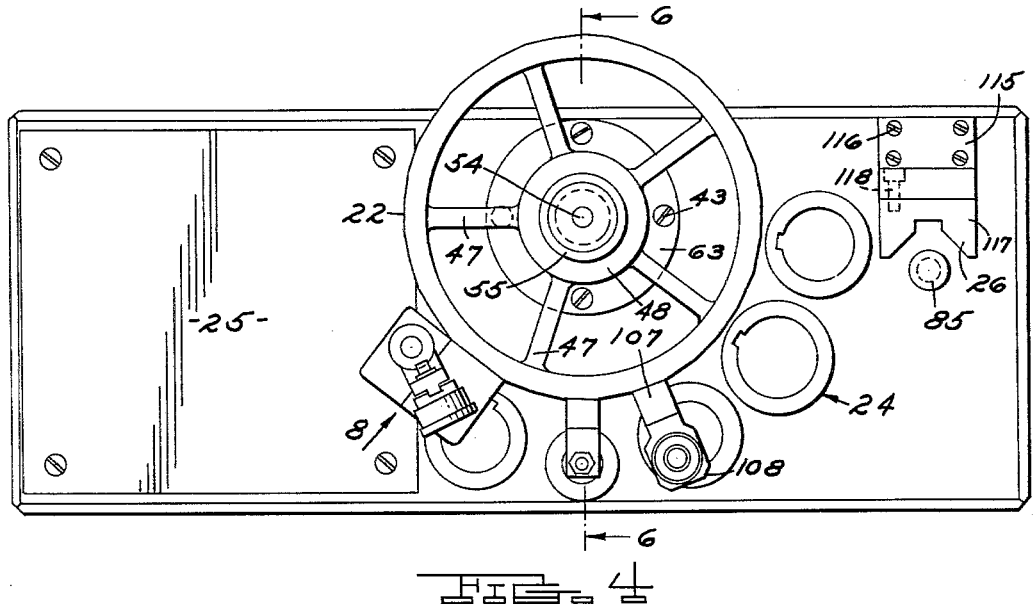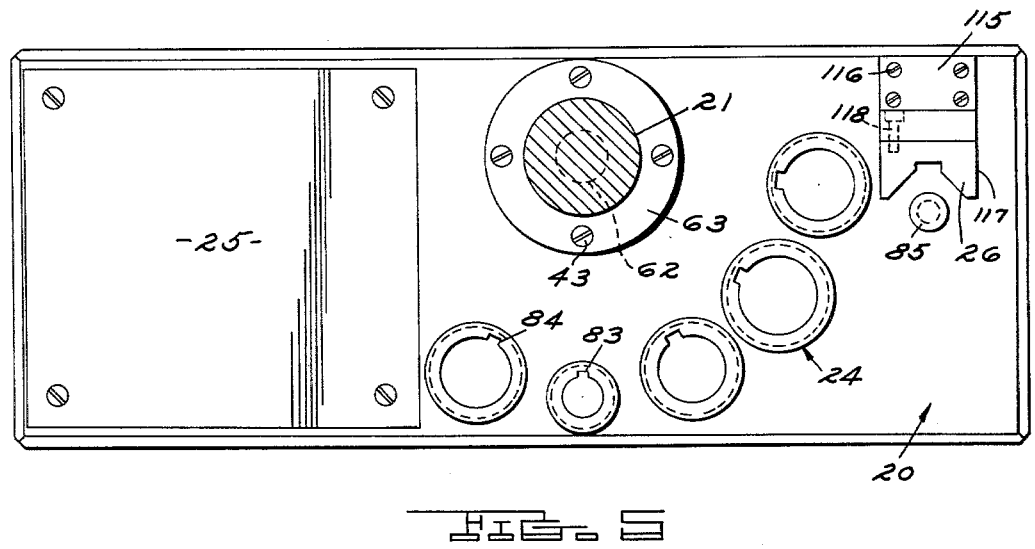

Nov. 2, 1965     J. H. PAULICK, JR     3,214,822
TURRET GAGE
Filed Sept. 27, 1962     6 Sheets-Sheet 3
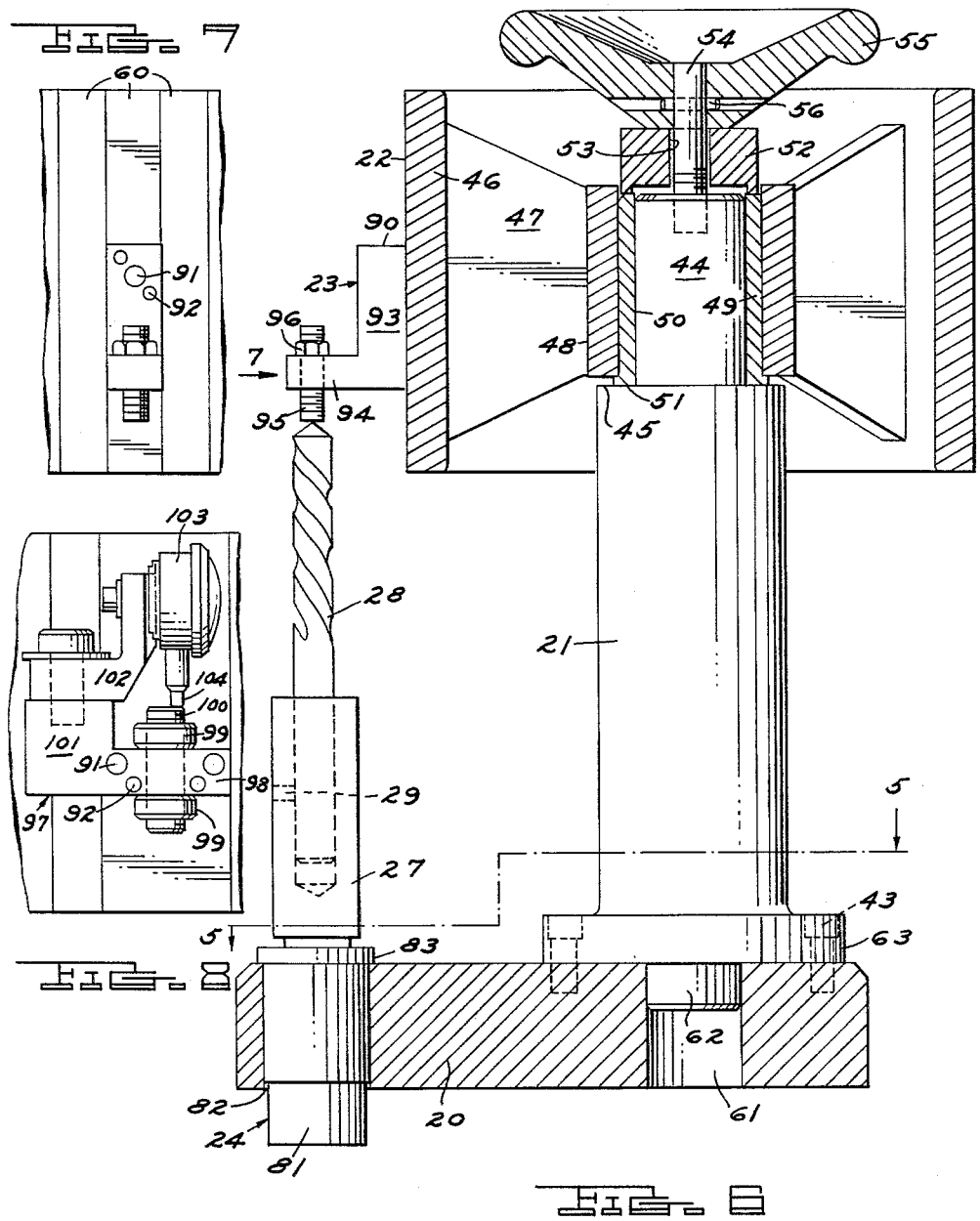
INVENTOR.
JOSEPH H. PAULICK, JR.
BY
ATTORNEY Nov. 2, 1965     J. H. PAULICK, JR     3,214,822

TURRET GAGE

Filed Sept. 27, 1962     6 Sheets-Sheet 4

INVENTOR.
JOSEPH H. PAULICK, JR.
BY
ATTORNEY

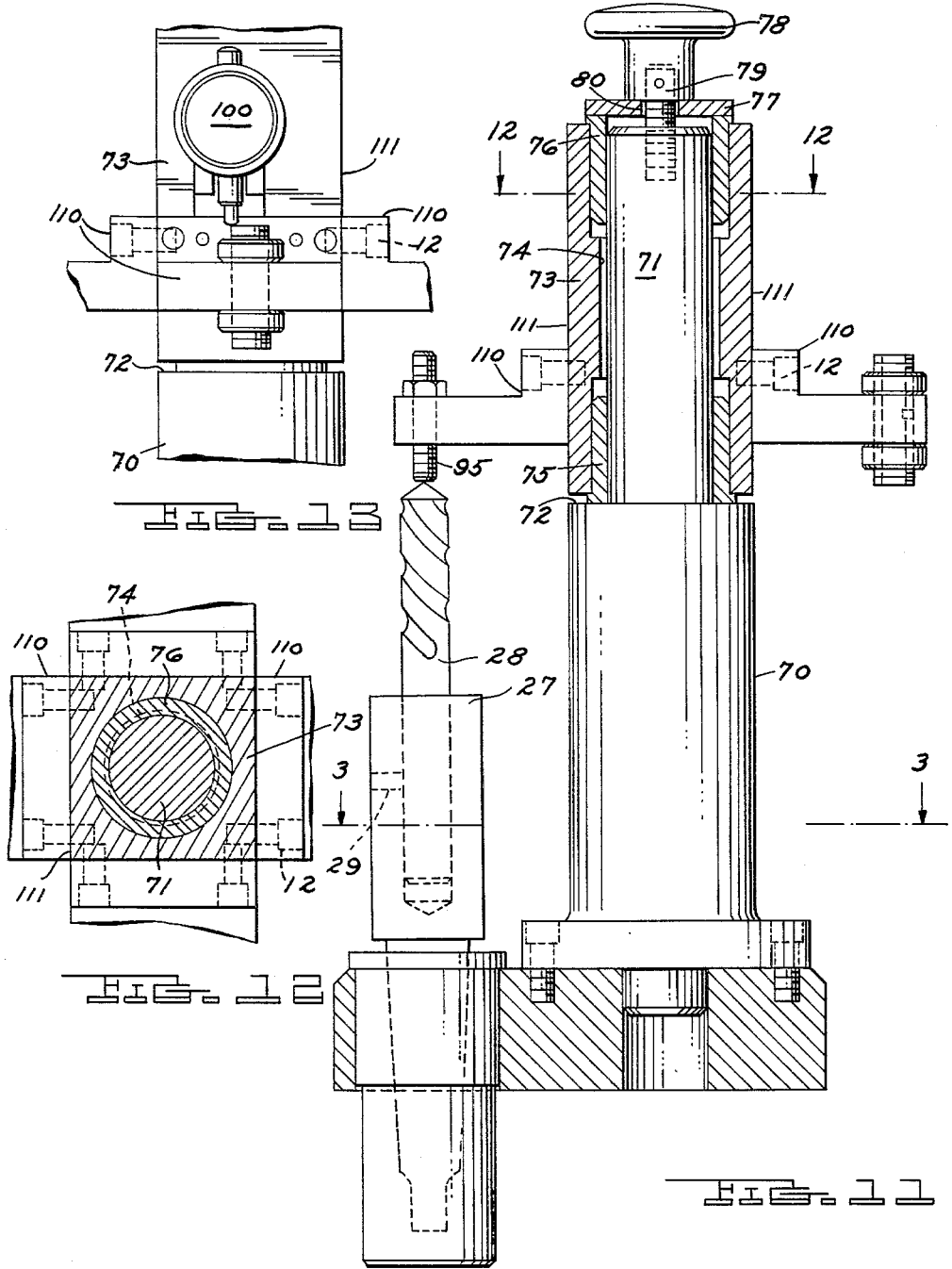

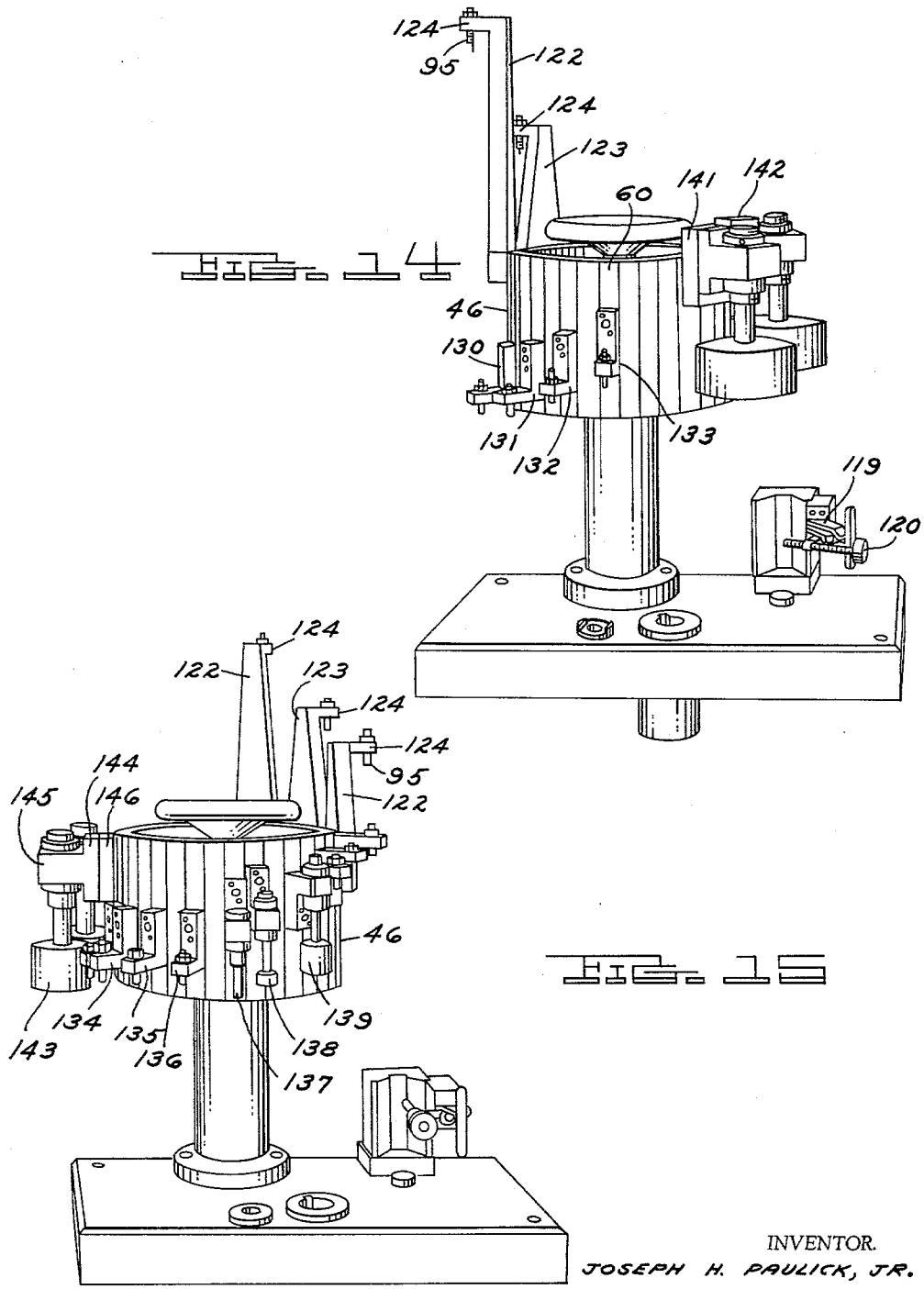

United States Patent Office 3,214,822
Patented Nov. 2, 1965

3,214,822
TURRET GAGE
Joseph H. Paulick, Jr., 32401 Stephenson Super Highway
Madison Heights, Mich.
Filed Sept. 27, 1962, Ser. No. 226,553
1 Claim. (Cl. 29—57)

This invention relates to multiple gage combinations for setting a multiplicity of different tool and holder replacement assemblies accurately relative to one another so that upon like tools and holders becoming worn in use a machine, each accurately gaged replacement tool and holder assembly may be quickly inserted in the machine in accurate relationship between the established tool operating means and an accurately located workpiece so as to be in exact position to properly perform a tool operation on the workpiece.

When a worn tool is removed from the machine it is separated from the holder and sent to the tool room for sharpening and/or repair. The resharpening and repair of the tool changes its character in some way such as length, dimension, etc. It must now be re-set in its holder accurately so that its workpiece penetration and/or material removal and/or tool action will be exactly the same as before. This process of tool changing, sharpening and repair, and pre-setting goes on continuously to cope with the demand for sharp, properly set tools by the hundreds and thousands.

It is vitally important that each tool holder and tool assembly be accurately gaged or the tool will not be in proper location, position, and extention between the tool operating means and the workpiece.

One of the main causes of incorrect setting of tool and holder assemblies has been found to be using the wrong gage. These gages heretofore have been separate or unattached or unmounted and used relative to a surface plate on the tool board workbench. In the press of production, the gages lay around on the workbench and the workman may use the wrong gage by incorrect selection. These gages may all look pretty much alike and may not differ from one another by too much so that error may not be so large as to be visually noticeable. But a small difference may be such that the tool goes too deep such as through a block wall into a water jacket chamber or be so shallow that the following tool breaks off when it bottoms causing an unscheduled emergency shut down of the entire machine. Worse than that, the broken tool may not be discovered.

Moreover, it is very difficult for a workman to properly hold the gage relative to the surface plate in the first place as any slight angulation makes a difference in measurement. Secondly, it is difficult to hold the tool relative to the holder in proper relationship to both the surface plate and the gage. Thirdly, it is very difficult to secure, tighten, and/or lock the tool and holder together accurately. This is difficult to do in itself accurately let alone also hold the tool relative to the holder, hold both relative to the gage and surface plate, and also hold the gage relative to the surface plate all at the same time. This is not only difficult but time consuming and very little time used cumulates to a large total in setting hundreds of tools.

The gage assembly of the invention is therefore a key development in providing properly gaged tools.

With the foregoing in view, it is a primary object of the invention to provide gage means which are fixed and readily available in a specific position so that they cannot be lost or mislaid.

Another object of the invention is to provide a multiple gage assembly mounting all the gages on one head in one location so that the gaging operation is easily controlled.

Another object of the invention is to provide a base plate in the multiple gage assembly having clamps and sockets for holding the tool or tool holder in the proper gagable position obviating manual holding of that part by the operating mechanic.

Another object of the invention is to provide gages on a common head selectively positionable and accurately fixable relative to the surface plate surface, socket, or clamp wherein the head supports the gage element obviating the necessity of manually positioning and holding the gage element.

An object of the invention is to provide a supporting head which is rotatable so that the desired gage element is easily located over the mating surface, socket, or clamp.

An object of the invention is to provide simple accurate locking and unlocking means on the rotatable head so that it can be quickly rotated and locked in the desired position.

An object of the invention is to provide a gage assembly where the operating mechanic needs only two hands, one hand to tighten the locking means on the tool holder and the other hand to hold the tool in the gaged position with the gage element and surface plate and tool holder being mechanically held.

An object of the invention is to provide a gage assembly having a single rotatable head capable of supporting and properly positioning all the different gage elements needed to gage all the different tool sets serviced thereon.

An object of the invention is to provide a gage assembly which is adaptable for use with any kind or type of gage.

An object of the invention is to provide a gage assembly which is usable over a long period regardless of tool changes as the gage elements may be relocated and/or new gage elements used on the head and/or the base plate.

An object of the invention is to provide stable extension arms on the head or drum for locating gage elements outside the limits of the head.

An object of the invention is to provide a plurality of locations on the head for mounting a plurality of gages thereon in sequence around the head so that each gage element is easily identified by the operator.

These and other objects of the invention will become apparent by reference to the following description of the novel multiple gage assembly embodying the invention taken in connection with the accompanying drawings in which:

FIG. 1 is a face elevational substantially miniature view of four tool boards equipped with the novel multiple gage assembly.

FIG. 2 is a larger face elevational view of a single tool board showing its organizing and the basic multiple gage assembly in more detail.

FIG. 3 is a side elevational view of the tool board and gage assembly seen in FIG. 2.

FIG. 4 is an enlarged top plan view of the gage assembly seen in FIGS. 2 and 3 additionally showing gage elements, sockets, clamps, and a surface plate.

FIG. 5 is a view similar to FIG. 4 on the line 5—5 of FIG. 6 with the head structure removed to show the surface plate sockets, clamps, and surface plate more clearly.

FIG. 6 is a cross-sectional view of FIG. 4 taken on the line 6—6 thereof.

FIG. 7 is a partial side elevational view of FIG. 6 as indicated by the arrow 6 showing a gage element in detail.

FIG. 8 is a partial side elevational view of another gage element taken in the direction of the arrow 8 in FIG. 4.

FIG. 11 is a cross-sectional view of FIG. 10 taken on the line 11—11 thereof.

FIG. 12 is a cross-sectional view of FIG. 11 taken on the line 12—12 thereof.

FIG. 13 is a face elevational view similar to FIG. 8 showing the gage element from a different viewpoint.

FIG. 14 is a perspective view of the gage assembly of FIGS. 1–9 showing various gage elements and also showing extension arms; and FIG. 15 is a view similar to FIG. 14 showing other gage elements in other positions.

Figure 10:
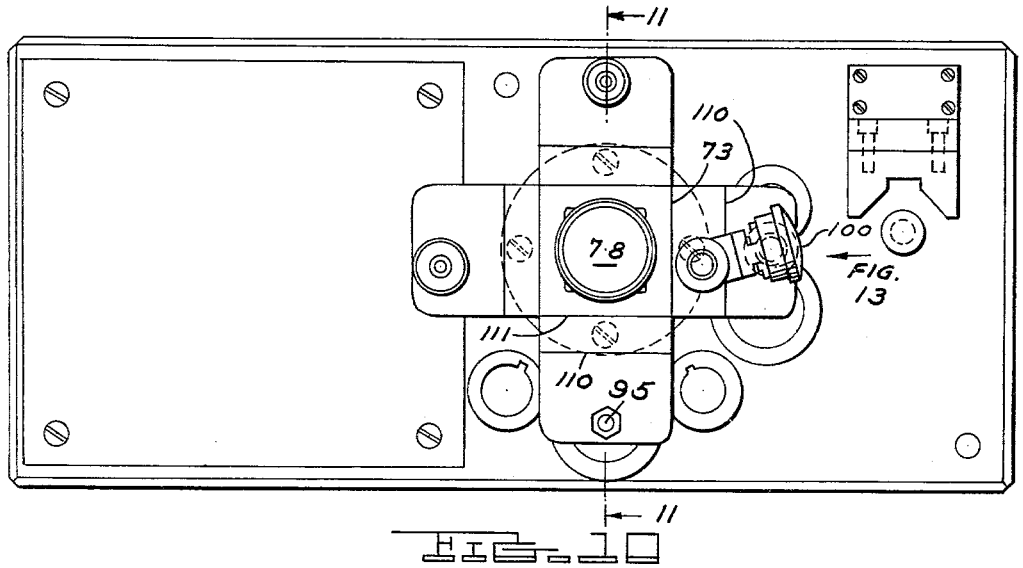
FIG. 10 is a top plan view of a gage assembly having an alternate head construction.

Referring now to the drawings wherein like numerals refer to like and corresponding parts throughout the several views, the turret gage 19 shown therein singly and in combination with tool boards comprises a base plate 20 supporting a column 21 carrying a head 22 which holds a plurality of gage elements 23 in selected positions above a series of holder sockets 24, a surface plate 25, and a clamp 26. A tool holder 27 is held in the sockets 24, clamp 26, or located on the surface plate 25, and a tool 28 in the holder 27 is moved against the gage element 23 and a lock screw 29 on the holder 27 is then tightened against the tool 28 fixing the tool 28 and holder 27 in an accurately gaged condition.

The turrent gage is mounted on a tool board 30 workbench 31 extending end 32 which is elevated on a pair of legs 33. The workbench 31 supports a board 34 having tool and holder assembly supporting panels 35 and a center counter panel 36 which contains a plurality of counters 37 enclosed in a transparent cover 38 secured by a lock 39 so that unauthorized personnel cannot move a counter indicator 40 relative to a dial 41. Each panel 35 has at least one tool and holder assembly receiving aperture 57 or other supporting means and each panel 35 is associated with a counter 37 by proximity and with the machine in the transfer line by an identification plate 42.

The identification plate identifies the gage element 23 and socket 24 for gaging the tool sets in a panel 35 and its also identifies the tool and holder assemblies stored in each panel 35.

More particularly, the turret gage 19 base plate 20 has an opening 61 receiving a boss 62 on the column 21 accurately locating the column 21 which has a flange 63 overlying the base plate 20 and secured thereto by bolts 43. The column 21 has an accurately machined stub shaft 44 at its upper end extending above an accurately machined shoulder 45. The head 22 has an outer annular drum 46 with internal webs or spokes 47 leading to a hub 48. A flanged sleeve bearing 49 is fixed in the hub 48 and has a tubular portion 50 radially surrounding the stub shaft 44 and a ring portion 51 lying axially between the hub 48 and the column shoulder 45 rotatably supporting the head 22 on the column 21.

A clamp block 52 lies axially above the stub shaft 44 in contact with the sleeve bearing 49 upper end and has an axial aperture 53 freely receiving a screw 54 which is threaded in the stub shaft 44. A hand wheel 55 is fixed on the screw 54 by a key 56 and the hand wheel abuts the clamp block 52. Turning the hand wheel 55 down on the clamp block 52 moves the clamp block 52 into pressed engagement with the bearing 49 fixed on the hub 48 securing the head 22 against rotation relative to the column 21 and fixing it in the desired angular location. Turning the hand wheel 55 off the clamp block 52 allows the operator to rotate the head 22.

The outer periphery of the drum 46 portion of the head 22 is machined off in multiple tangential flats or facets 60 on which each gage element 23 is mounted. The facets 60 provide an accurate surface parallel to the axis of the column 21 and each facet 60 provides an extensive lineal surface axially on the head 22 for mounting gage elements at various desired distances from the base plate 20.

An alternate head structure is shown in FIGS. 9–12 wherein a column 70 has a top shaft 71 rising above a radial shoulder 72. A rectangular head 73 has an axial bore 74 in which flanged sleeve bearings 75 and 76 are frozen with their tubular portions surrounding the stub shaft 71 and their flange portions overlapping the ends of the head 73. The bottom bearing 75 flange portion also rides on the pedistal shoulder 72 while the top sleeve bearing 76 flange portion is contacted by a clamp block 77. A hand knob 78 is in contact with the clamp block 77 and has a screw 79 leading through an aperture 80 in the clamp block 77 and threaded in the column stub shaft 71.

By turning the knob 78 down against the clamp block 77, the bearings 75 and 76 are pressed between the block and the column shoulder 72 holding the head 73 in any adjusted angular position. By turning the knob 78 of the block 77, the bearings 75 and 76 are freed permitting the head 73 to rotate freely on the stub shaft 71.

The sockets 24, surface plate 25, and clamps 26 on the base plate 20 are located radially relative to the columns 21 or 70 so as to be directly below cooperating gage elements 23 on the drums of heads 22 and 73. The sockets 24 may include the adapter cups 81 set in apertures 82 of the base plate 20. The adapter cup 81 radially extending top flange 83 has an accurately machined bottom surface lying on an accurately machined surface on the base plate 20. The base plate apertures 82 and adapter cups 81 are of various sizes to accommodate various size tool holders 27. The interior surface of the adapter cup is accurately machined and may have a key way 84 for receiving a key on a tool holder or other suitable receiving and locating means such as special individual means requiring special cooperating means on the tool holder so that only the proper tool holders can be inserted in that adapter cup.

The sockets 24 are coordinated to receive the tool holders 27 in the same or relatively the same position as the tool operating means, chuck, collet, or spindle and in this way the holder is pre-loacated prior to actual insertion in the tool operating means.

The clamp 26 is also coordinated relative to the tool holder 27 position in the tool operating means and may include an accurately lapped surface rest button 85 for locating the tool holder in position.

The surface plate 25 has an accurately lapped finish and is used relative to the gage elements where sockets 24 and clamps 26 are not suitable or where surface plate gaging is preferable.

The gage elements 23 comprise in some instances FIGS. 6 and 7, an L-shaped mount or bracket 90 fixed on the drum 46 flat facets 60 as by a machine screw 91 and dowels 92 with bracket stem portion 93 abutting the drum facet 60 and with a foot portion 94 extending radially outwardly. The foot 94 has a threaded aperture receiving a threaded gage point or plug 95 and a lock nut 96 holds the plug 95 in adjusted axial position. The gage is set by adjusting the plug 95 and tightening the lock nut 96.

Another mount or bracket 97, FIGS. 4 and 8, may include a plate 98 fixed on the drum facet 60 by screws 91 and dowels 92 and be equipped with threaded bushings 99 holding a threaded sleeve adapter 100 housing a sliding flush pin, not shown, which registers with the top of the adapter sleeve 100. The bracket 97 may also include a boss 101 supporting an arm 102 holding a dial indicator 103 having a plunger 104 in contact with the flush pin or in contact with the sleeve 100 at zero reading so that the position relative to the sleeve 100 can be accurately read. The arm 102 is secured to the boss 101 by a bolt 105 and spring washer so that the indicator 103 may be moved off the sleeve 100 such as for manually reading the flush pin relative to the sleeve 100 by sight or touch.

Another mount bracket 107, FIG. 4, may have an enlarged foot 108 housing the bushings 99, sleeve 100, and flush pin, not shown, for manual gaging.

Referring to FIGS. 9-13, the alternate turret gage construction may have a relatively wide L-shaped bracket 110 fixed to each flat side 111 by screws 112 and these may be equipped with a gage point or plug 95, a flush pin sleeve 100 gage, or a dial indicator 105 gage as desired. Obviously, dial indicators may be directly mounted on the brackets 110 or 93 for direct reading relative to a tool.

The clamp 26 is secured on the base plate 20 by L-shaped bracket 115 fixed to the base plate 20 by screws 116. A holder and positioning means such as a V-block 117 is attached to the bracket 115 by screws 118 relative to the rest button 85. A clamp arm 119, FIGS. 14 and 15, is swung on the V-block 117 and has an adjusting thumb screw 120 for jamming the tool holder 27 against the V-block 117 in a fixed supported condition. The clamp arm 119 is adapted to lock and unlock relative to the V-block for clamping and swinging out to a clear position for removing gaged tool assemblies and for inserting holders and tools to be gaged in assembly.

Figure 9:
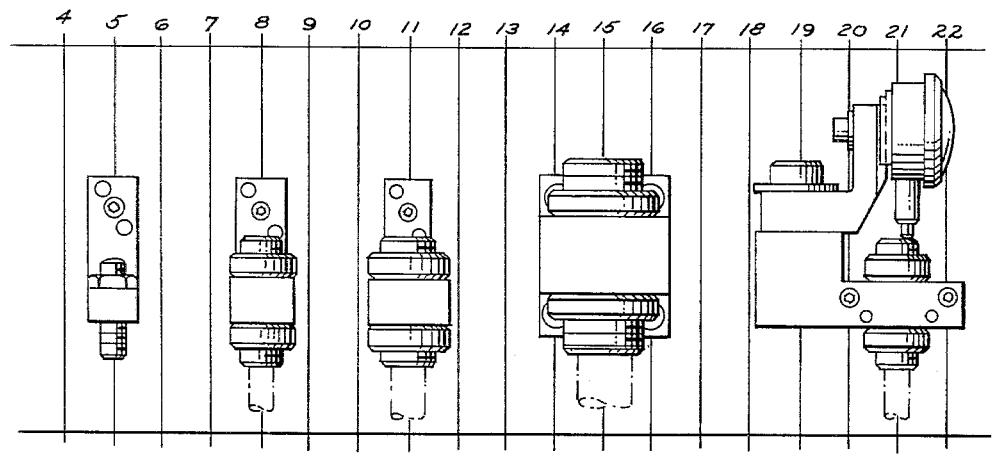
FIG. 9 is a partial roll out view of the circular drum of the gage showing the face facets numbered on center line and various gages.

Referring to FIGS. 9, 14, and 15, showing different turret gage assemblies 19 equipped with various gages, a long extension arm 121, a short extension arm 122, and an intermediate extension arm 123 each have a foot 124 supporting gage plugs 95. Obviously, flush pin gages, dial indicators, or other type or style gages may be used on the extension arms 121, 122, and 123, which are attached to the drum 46 over the flat facets 60 at the desired height or position thereon. The extension arms facilitate gaging extremely long tool and short tool holder assemblies. In this connection it will be understood that the brackets 110, FIG. 11, can be placed at any desired height on the flat 111 of the head 73 to accommodate long and short tool and tool holder assemblies.

Point or plug gages are located on the drums 46 at various positions and heights such as at 130, 131, 132, 133, 134, 135, and 136. A manual flush pin gage may be located at 137. Flush pin gages with enlarged contact faces may be mounted as at 138 and 139. Gages with extremely large contact faces may be located at 140, 141, 142, and 143, and 144, these large heavy gages are mounted on the stems 145 of the T-brackets with the bracket webs 146 screwed to the drum 46 over the facets 60. The gages having the large contact faces are usually employed to set the heads of multi-tooth cutters accurately relative to the holders so that the teeth will all lie in the same plane and do equal work. These large faces are also convenient for setting other large tools or tools employing multi-element teeth.

It can now be seen that the turret gage assembly 19 is capable of gaging a multiplicity of different tools accurately by swinging the head to locate the proper gage element over the proper holder or socket element.

To gage a set of tool and holder assemblies, the operator places a tool holder 27 in the proper holding means such as a socket 24 or clamp 26, loosens the hand wheel 55, and rotates the drum 46 to locate the proper gage element 23 over the proper holder means. He then places the tool 28 in the holder 27 and extends it against the gage element 23 such as the plug or point gage 95 or flush pin gage 100 and then tightens the lock screw 29 or other lock means on the tool holder 27 securing the tool 28 and holder 27 in the accurately gaged positions. He is materially assisted in this regard by the fact that the turret gage assembly 19 has the gages and holders securely mounted and the tool holder supported. The operator's two hands are thus unencumbered and he may use one to extend the tool against the gage and the other to set the lock means on the tool holder.

The turret gage assembly 19 not only facilitates quickly gaging and setting the tools and holders but also insures that the correct gages are in proper rotational sequence.

Either rotatable head 22 or 73 locates the desired gage element in the use position and locates the other gage elements in a non-use position out of the way automatically. As the gage elements are always properly set any one may be placed in the use position immediately.

Although preferred embodiments of the invention have been shown and described in detail, it is obvious that many changes may be made in the size, shape, detail, and arrangement of the various elements of the invention within the scope of the appended claim.

I claim:

A multiple gage assembly particularly suitable for use in pre-setting a plurality of different tool and tool holder assembly sets on tool boards comprising
- a base plate,
- a column on said base plate,
- a rotatable head on said column,
- a plurality of first gage means on said base plate for establishing the tool holder portion of a certain individual tool and tool holder assembly in a set at a known gage point;
- a plurality of second gage means on said head for establishing the tool of the certain individual tool and tool holder assembly in a set at a known gage point;
- said second gage means rotating with said head so as to locate one said second gage means on said head for a certain tool and tool holder assembly set over one said first gage means on said base plate for the certain tool and tool holder assembly set as selected for gaging individual tool and tool holder assemblies of the set therebetween;
- locking means on said head and column selectively locking said head stationary at the desired location of one said second gage means selected for use relative to one said first gage means selected for use;
- and extension arms on said head holding said second gage means beyond the plane of said head such as for gaging relatively long and relatively short tool and tool holder assemblies which extend out of the plane of said head.

References Cited by the Examiner

UNITED STATES PATENTS

| Re.24,491 | 6/58 | Cross et al. | 340—267 |
|---|---|---|---|
| 804,793 | 11/05 | Chard et al. | 82—2 |
| 2,783,461 | 2/57 | Paulick | 340—267 |
| 2,844,877 | 7/58 | Mogolis | 33—147 |
| 2,963,695 | 12/60 | Cross et al. | 340—267 |
| 3,047,959 | 8/62 | Seibert | 33—185 |
| 3,050,862 | 8/62 | Koch | 33—185 |

FOREIGN PATENTS 369,503  2/21  Germany.

RICHARD H. EANES, JR., *Primary Examiner.*

WILLIAM W. DYER, JR., *Examiner.*